United States Patent
Yeganeh et al.

(12) United States Patent (10) Patent No.: US 10,789,548 B1
Yeganeh et al. (45) Date of Patent: Sep. 29, 2020

(54) AUTOMATIC RE-TRAINING OF OFFLINE MACHINE LEARNING MODELS

(71) Applicant: Amazon Technologies, Inc., Seattle, WA (US)

(72) Inventors: Naiem Khodabandehloo Yeganeh, Seattle, WA (US); Sheng Bi, Bellevue, WA (US); Paul Grunchich, Everett, WA (US); Royden Mark Jacob Lewis, Seattle, WA (US); Hunlan Lin, Seattle, WA (US); Chenzhi Shao, Kirkland, WA (US); Chun-Che Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 847 days.

(21) Appl. No.: 15/263,292

(22) Filed: Sep. 12, 2016

(51) Int. Cl.
    *G06N 20/00* (2019.01)

(52) U.S. Cl.
    CPC .................. *G06N 20/00* (2019.01)

(58) Field of Classification Search
    CPC ................................... G06N 20/00
    USPC .......................................... 706/12
    See application file for complete search history.

(56) References Cited

U.S. PATENT DOCUMENTS

| | | | | |
|---|---|---|---|---|
| 7,698,410 B2* | 4/2010 | Seth | .......... | H04L 67/20 709/223 |
| 10,552,863 B1* | 2/2020 | Sadagopan | ............ | G06N 5/003 |
| 2003/0004781 A1* | 1/2003 | Mallon | ................... | G06Q 10/06 705/7.31 |
| 2003/0200189 A1* | 10/2003 | Meng | ..................... | G06N 3/082 706/26 |
| 2012/0290662 A1* | 11/2012 | Weber | .................. | G06Q 10/107 709/206 |
| 2013/0158840 A1* | 6/2013 | Lu | ....................... | F02D 41/2432 701/104 |
| 2017/0061286 A1* | 3/2017 | Kumar | ................... | G06Q 30/00 |
| 2018/0276561 A1* | 9/2018 | Pasternack | ............ | G06N 5/041 |
| 2019/0042976 A1* | 2/2019 | Tanglertsampan | ..... | G06N 5/022 |
| 2019/0197403 A1* | 6/2019 | Schmidhuber | ......... | G06N 3/084 |
| 2019/0228105 A1* | 7/2019 | Ma | ....................... | G06F 16/951 |

OTHER PUBLICATIONS

Hadjadji et al. "Optimized Selection of Training Samples for One-Class Neural Network Classifier", 2014, IEEE, pp. 345-349. (Year: 2014).*

* cited by examiner

*Primary Examiner* — Hien D Khuu

(74) *Attorney, Agent, or Firm* — Knobbe, Martens, Olson & Bear, LLP

(57) ABSTRACT

Systems and methods are provided for retraining a machine learning model to learn a retrained machine learning model. After a computing system receives an execution log of a prediction service and an observed user action, it may create retraining data. From the retraining data, the computing system may learn a retrained machine learning model. The retrained machine learning model can be used to compute future predictions of user actions if it has an improved performance over the original machine learning model.

18 Claims, 5 Drawing Sheets

US 10,789,548 B1

AUTOMATIC RE-TRAINING OF OFFLINE MACHINE LEARNING MODELS

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a model may be implemented as a machine learning model. A machine learning algorithm may be used to learn a machine learning model from training data. The parameters of a machine learning model may be learned in a process referred to as training. For example, the parameters or weight values of a machine learning model may be learned using training data, such as historical data that includes input data and the correct or preferred output of the model for the corresponding input data. A machine learning model may be used to compute predictions based on historical data. However, the performance of a machine learning model may degrade over time.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
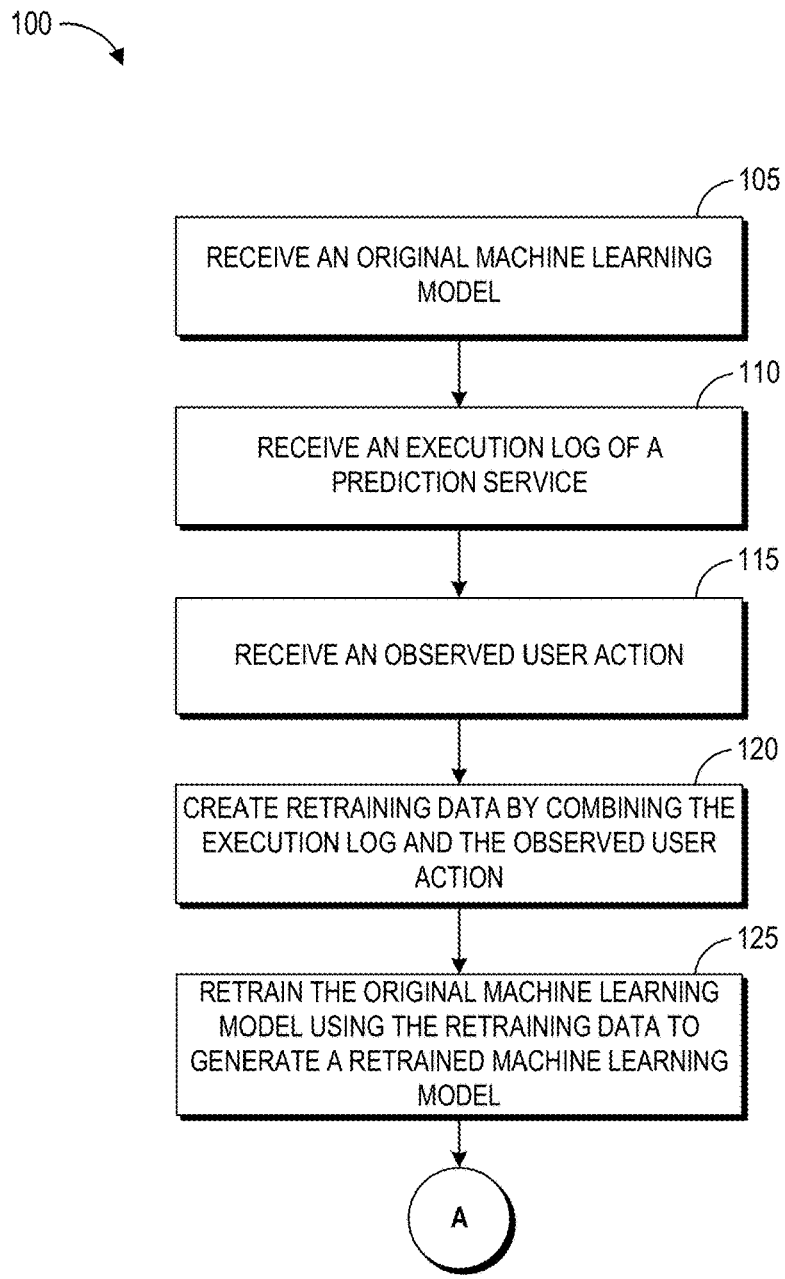
FIG. 1 is a flow diagram depicting an illustrative method for creating retraining data and learning a retrained machine learning model using the retraining data.

Generally described, aspects of the present disclosure relate to creating data for updating or retraining a machine learning model automatically and learning an updated machine learning model automatically, such as in real time or near real time, or on a batch or periodic basis (e.g., every hour, day, or week). Traditionally, an offline machine learning model is trained offline with historical data. For example, in a retail context, historical data may include historical user purchase data. The offline machine learning model may be used to generate predictions and recommendations (e.g., predicted future user purchase behavior and product recommendations for users). The predictions and recommendations may be generated in real time or near real time (e.g., while users browse or purchase products on a retail website) or on a periodic basis (e.g., every hour, day, or week). However, data obtained after the offline machine learning model is trained (e.g., subsequent purchases by users that are later observed) do not affect the offline machine learning model. Consequently, the offline machine learning model may have degrading performance over time, which may be due to changes in user behavior over time. Furthermore, the effectiveness of an offline machine learning model typically cannot be determined or monitored easily in real time. For example, whether products recommended to users are products that users may be interested in buying may not be determined in real time.

In contrast, aspects of the present disclosure, according to some embodiments, enable, automatically and/or in real time, creating retraining data for updating a machine learning model and learning an updated machine learning model using the training data. The updated machine learning model may be used in a variety of machine learning applications and other systems, such as item recommendation. For example, the updated machine learning model may be used for generating recommendations of items that a user may wish to view, obtain, access, etc. based on the user's prior actions regarding other items. In some embodiments, the effectiveness of an offline machine learning model may be determined by comparing its performance to the performance of an updated machine learning model learned using retraining data created automatically. Advantageously, the methods disclosed herein may be used to learn different kinds of updated machine learning models, including neural networks, support vector machines, regression models, and/or others. In some implementations, aspects of the present disclosure may be implemented as a plug and play interface that only requires users to specify the logic for determining the effectiveness of machine learning models and the real time data used to learn updated machine learning models.

The performance of an original machine learning model may degrade over time. To improve the performance of the original machine learning model, the model may be retrained to generate a retrained or updated machine learning model. The original machine learning model may be trained using training data from a training data store, such as a data warehouse. The training data may include training data input vectors and reference data output vectors.

The training data used for training the original machine learning model and the training data used for training the retrained or updated machine learning model can be from different sources or can be distinct. For example, the training data for training the original machine learning model may be from a data store that receives indications of user behavior from an application service (e.g., a retail server or an online streaming service). In contrast, the training data for training the retrained machine learning model may be from the application service and a prediction service.

In some embodiments, the prediction service may provide its execution log of the prediction service. The execution log may include an input vector representing a previously observed action by a user (e.g., the user watching a particular video). The prediction service may generate a predicted action by the user (e.g., predicting that the user will watch another video in the same genre) with respect to the application service using the original machine learning model. The execution log thus includes a previously observed action by a user and a corresponding prediction of a user action in the future.

The application service may provide an observed user action (e.g., the user actually watching another video in the same genre) with respect to the application, such as within 10 minutes, one hour, or one day of the user action being observed by the application. Advantageously, querying a data warehouse for the observed user action may be unnecessary.

Retraining data may be created by combining the execution log received from a prediction service and the observed user action from the application service. The retraining data may include a retraining data input vector and a corresponding reference retraining data output vector. The retraining data input vector may include the previously observed action by the user that is part of the execution log. The reference retraining data output vector may include the observed action of the user received from the application service.

Learning the retrained machine learning model may include learning the weight values of the retrained machine learning model by generating an output vector using the retrained machine learning model and the retraining data input vector. The weight values of the machine learning model may be updated based on a difference between the output vector and the reference retraining data output vector corresponding to the training data input vector.

A difference in performance between the original machine learning model and the retrained machine learning model may be determined. The performance difference may be determined using evaluation data. The evaluation data and the retraining data may be created similarly. If the performance improvement of the retrained machine learning model is sufficiently large (for example, greater than 0.1% in true positive rate), the retrained machine learning model may be provided to the prediction service, which may then generate subsequent predictions using the retrained machine learning model. If instead the performance improvement is not sufficiently large or is negative, the prediction service can generate subsequent predictions using the original machine learning model.

FIG. 1 is a flow diagram depicting an illustrative method 100 for creating retraining data and learning a retrained machine learning model using the retraining data. The method 100 may be embodied in a set of executable program instructions stored on a computer-readable medium, such as one or more disk drives, of a computing system, such as the computing system 500 shown in FIG. 5 and described in greater detail below. When the method 100 is initiated, the executable program instructions may be loaded into memory, such as RAM, and executed by one or more processors of the computing system 500. Although the method 100 is described with respect to the computing system 500 shown in FIG. 5, the description is illustrative only and is not intended to be limiting. In some embodiments, the process 100 or portions thereof may be performed serially or in parallel by multiple computing systems.

The illustrative method begins at block 105, where the computing system 500 receives an original machine learning model. The original machine learning model may be used in a variety of machine learning applications and other systems, including but not limited to: item recommendation generation, automatic speech recognition, facial recognition, handwriting recognition, and image recognition. For example, the original machine learning model may be used for generating recommendations of items that a user may wish to view, obtain, access, etc. based on the user's prior actions regarding other items.

In some implementations, the computing system 500 may train an original machine learning model using training data. The computing system 500 may receive the training data used in training the original machine learning model from a training data store, such as a data warehouse. In some implementations, the computing system 500 may create training data based on data received from a data store. The training data may include training data input vectors and reference data output vectors. The training data input vectors and the reference data output vectors may be sparse (e.g., many elements of the vectors may have zero values). In some embodiments, elements of a vector may correspond to items, such as books, on-demand videos, music albums, tools, or the like. Illustratively, if the data store includes the purchase histories of users for 60,000 items, some purchases may be totally unrelated to other purchases. This may be referred to as "noisy" data. If noisy data is used to train a machine learning model, a percentage of the training data may be outliers with respect to the machine model learned. The computing system 500 may process the noisy data received form the data store to generate training data that is not "noisy" or that only includes a percentage of "noisy" data (e.g., 1%, 2%, 5%, 10% or more). In some implementations, the data in the data store may be assumed to be up to date and not "noisy."

The performance of the original machine learning model may degrade over time. For example, immediately after the original machine learning model is trained, it may have a 90% true positive rate. However, during a subsequent month, the true positive rate of the original machine learning model may drop to 80%. In some implementations, a small change in the true positive rate may be undesirable because of the large number of users whose behaviors may be predicted by the computing system 500.

Next, at block 110, the computing system 500 may receive an execution log of a prediction service or a prediction server. The execution log may be received from the prediction service. The execution log may include an input vector representing a previously observed action by a user (e.g., the user spent $10,000 during the previous quarter). The prediction service may receive the input vector from a data store. The prediction service may generate a predicted action by the user (e.g., the user will spend $15,000 this quarter, the user will spend some money this quarter, or the user will spend some money during the first month of this quarter) with respect to an application service (e.g., a service associated with an electronic commerce system) using the original machine learning model received at block 105 and the input vector. The execution log may include the predicted action by the user corresponding to the input vector, where the input vector represents a previously observed action by the user.

At block 115, the computing system 500 may receive an observed user action (e.g., the user actually has spent $12,000 during this quarter) with respect to an application service. In some embodiments, the computing system 500 may receive the observed user action from the application service in real time or near real time, once the user action is observed by the application service. In some embodiments, the computing system 500 may receive the observed user action on a batch or periodic basis (e.g., within an hour, day, or week after the user action is observed by the application). The predicted user action received as part of the execution log may be a prediction of at least one possible value of the observed user action. Advantageously, because the computing system 500 receives the observed user action with respect to the application from the application directly, the computing system 500 does not need to query a data warehouse, which may delay the timing of obtaining the observed user action.

At block 120, the computing system 500 may create retraining data by combining the received execution log and the observed user action. The retraining data may include a retraining data input vector and a corresponding reference retraining data output vector. The retraining data input vector may include the previously observed action by the user that is part of the execution log received at block 110. The reference retraining data output vector may include the observed action of the user received at block 115. The retraining data input vector and its corresponding training data output vector may include different numbers of elements. For example, an item such as a book or a video may no longer be available. In some implementations, one element of the retraining input vector and the observed action relate to an acquisition history of the same item. For example, the item may be a monthly or yearly subscription to a streaming service or a household item. In one example, the retraining data input vector includes an acquisition history by the user during a prior time period, such as a prior month. In this example, the reference retraining data output vector may be an acquisition history by the user during a subsequent time period, such as the month immediately after the prior month.

In some instances, the retraining data input vector and its corresponding reference retraining data output vector may constitute an outlier in the retraining data with respect to the original machine learning model received at block 105 or a retrained machine learning model to be learned at block 125. In some embodiments, the computing system 500 may not remove the retraining data input vector and its corresponding reference retraining data output vector from the retraining data whether it is an outlier or not.

In other embodiments, the computing system 500 may determine that the retraining data input vector and its corresponding reference retraining data output vector constitutes an outlier using the original machine learning model, and may remove outliers from the retraining data. The retraining data and the training data used to train the original machine learning model may be distinct. In some implementations, the retraining data may include some of the training data used to train the original machine learning model.

At block 125, the computing system 500 may retrain the original machine learning model using the retraining data to generate a retrained machine learning model. In some embodiments, the computing system 500 may learn the weight values of the retrained machine learning model by generating an output vector using the retrained machine learning model and the retraining data input vector. After determining a difference between the output vector and the reference retraining data output vector corresponding to the training data input vector, the computing system 500 may update the weight values of the machine learning model based on the difference. The computing system 300 may update the weight values to minimize the difference, in some embodiments.

Figure 2:
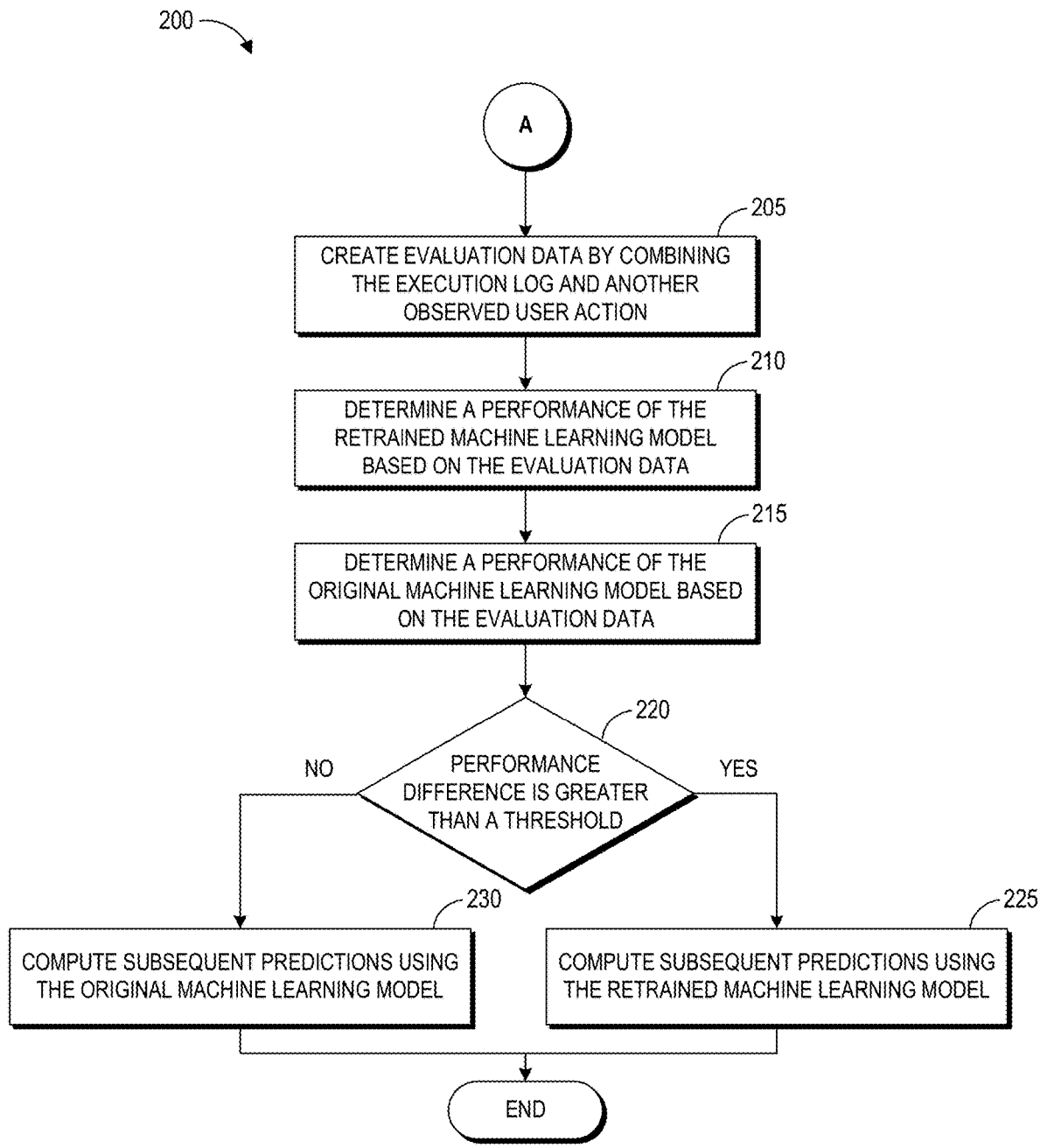
FIG. 2 is a flow diagram depicting an illustrative method for generating evaluation data and determining a performance improvement of a retrained machine learning model over an original machine learning model.

FIG. 2 is a flow diagram depicting an illustrative method 200 for generating evaluation data and determining a performance improvement of a retrained machine learning model over an original machine learning model. The process 200 may be embodied in a set of executable program instructions stored on a computer-readable medium, such as one or more disk drives, of a computing system, such as the computing system 500 shown in FIG. 5 and described in greater detail below. When the process 200 is initiated, the executable program instructions may be loaded into memory, such as RAM, and executed by one or more processors of the computing system 500. Although the process 200 is described with respect to the computing system 500 shown in FIG. 5, the description is illustrative only and is not intended to be limiting. In some embodiments, the process 200 or portions thereof may be performed serially or in parallel by multiple computing systems.

The illustrative method 200 may be implemented following implementation of method 100, discussed above, such that block 205 occurs subsequent to block 125 described above. At block 205, the computing system 500 may create evaluation data by combining the execution log and another observed user action. The evaluation data and the retraining data may be created similarly. The evaluation data may include an evaluation data input vector and a corresponding reference evaluation data output vector. The evaluation data input vector may include a previously observed action by the user. The previously observed action by the user may be part of the execution log received at block 110.

In other embodiments, the previously observed action by the user may be part of another execution log, and the illustrative method 200 may include receiving this other execution log. The reference evaluation data output vector may include the other observed action of the user. The other observed action of the user may be an action by the user with respect to an application service.

In some embodiments, the other observed action of the user may be received from the application service directly in real time or on a batch or periodic basis (e.g., within an hour, day, or week after the user action is observed by the application) without having to query a data store. In some implementations, the evaluation data may be a subset of the retraining data that is not used in learning the retrained machine learning model but instead used in evaluating the performance of the retrained machine learning model.

At block 210, the computing system 500 may determine a performance of the retrained machine learning model based on the evaluation data. The computing system 500 may determine a prediction using the retrained machine learning model and the evaluation data input vector. The computing system 500 may also determine a difference between the prediction determined by the retrained machine learning model and the reference evaluation data output vector.

At block 215, the computing system 500 may determine a performance of the original machine learning model based on the evaluation data. The computing system 500 may determine a prediction using the original machine learning model and the evaluation data input vector. The computing system 500 may also determine a difference between the prediction determined by the original machine learning model and the reference evaluation data output vector.

At decision block 220, the computing system 500 may determine whether the performance difference between the original machine learning model and the retrained machine learning model is greater than a threshold (e.g., 0.1%, 0.2%, 0.5%, 1%, or more in terms of true positive rate), which may have been previously set. If the computing system 500 determines at decision block 220 that the performance improvement of the retrained machine learning model is sufficiently large (e.g., greater than or equal to the threshold, in some embodiments), the illustrative method 200 proceeds to block 225 where the computing system 500 generates subsequent predictions using the retrained machine learning model. For example, the original machine learning model may be replaced in one or more services, systems or data stores with the retrained machine learning model. In some embodiments, the computing system 500 may provide the retrained machine learning model to one or more services, systems or data stores upon request.

If instead the performance improvement is not sufficiently large or is negative, the method 200 proceeds to block 230, where the computing system 500 generates subsequent predictions using the original machine learning model. For example, the original machine learning model may not be replaced with the retrained machine learning model, and instead the original model may continue to be used. In some implementations, subsequent predictions may be computed using both the original machine learning model and the retrained machine learning model.

Figure 3:
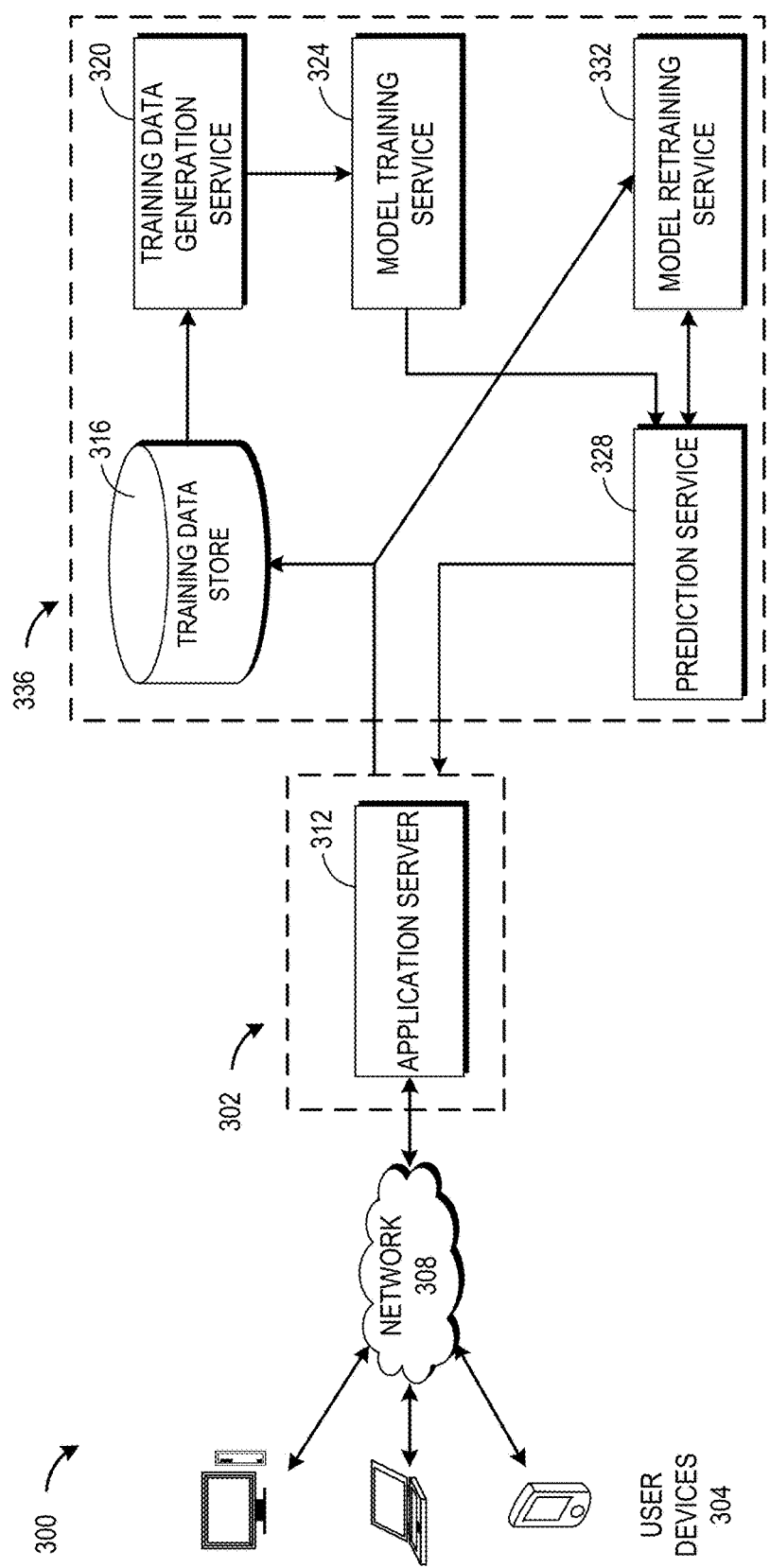
FIG. 3 is a block diagram depicting an illustrative operating environment for learning a retrained machine learning model.

FIG. 3 is a block diagram depicting an illustrative operating environment 300 for learning a retrained machine learning model. The illustrative operating environment 300 shown in FIG. 3 includes an electronic commerce system that enables users to browse items (such as items listed in an electronic catalog for purchase) using user devices 304 through a communication network 308. The electronic commerce system 304 may also provide users with recommendations. In some implementations, the computing system 302 may provide content streaming services to users. As will be appreciated, a retail service and/or a streaming service are simply provided as examples, as aspects of the present disclosure are applicable to a large number of other environments where predictions may be made using a machine learning model.

The electronic commerce system 302 may include an application server 312 (e.g., a retail server, or a streaming server) that provides users with an electronic catalog of items for purchases. The application server 312 may facilitate electronic browsing and purchasing of items using various user devices, such as user computing devices 304 (which may alternatively be referred to herein as client computing devices), through the communication network 308. The application server 312 is generally responsible for providing front-end communication with various user devices, such as a user computing device 304, via the network 308. The front-end communication provided by the application server 312 may include generating text and/or graphics, possibly organized as a user interface using hypertext transfer or other protocols in response to information inquiries received from the various user devices 304.

User computing devices 304 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

In the environment 300 shown in FIG. 3, a user of the electronic commerce system 302 may utilize a user computing device 304 to communicate with the application server 312 (e.g., a retail server) via the communication network 308, such as the Internet or other communications link. The network 308 may be any wired network, wireless network or combination thereof. In addition, the network 308 may be a personal area network, local area network, wide area network, cable network, satellite network, cellular telephone network, etc. or combination thereof. For example, the network 308 may be a publicly accessible network of linked networks, possibly operated by various distinct parties, such as the Internet. In some embodiments, the network 308 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 308 may use protocols and components for communicating via the Internet or any of the other aforementioned types of networks.

The application server 312 may be connected with or in communication with a training data store 316, which may store training data. Training data may include account information, purchase history, browsing history, item reviews and ratings, personal information, location information, billing information, and/or other information, depending on the embodiment. The training data store 316 may include information regarding users' previous actions, such as previous purchases. The application server 312 may provide indications of user actions with respect to the application server 312 to the training data store 316.

In some embodiments, the training data store 316 may be local to the electronic commerce system 302, may be remote from the electronic commerce system 302, and/or may be a network-based service itself. The illustrated data store may be embodied in hard disk drives, solid state memories, any other type of non-transitory computer-readable storage medium, and/or a file, a database, a relational database, in-memory cache, and/or stored in any such non-transitory computer-readable medium accessible to the application server 312 and/or a training data generation service 320. The data store 316 may also be distributed or partitioned across multiple local and/or storage devices, or combined into a single storage device, without departing from the spirit and scope of the present disclosure.

The training data generation service 320 may be connected to or in communication with the training data store 316. The training data generation service 320 may send instructions to the training data store 316 that provide the training data store 316 with the criteria for creating the training data. In some implementations, instead of providing the training data store 316 with the criteria for creating the training data, the training data generation service 320 may create training data from the data received from the training data store 316. The training data generation service 320 may provide a model training service 324 with training data, which the model training service 324 may use to learn an offline machine learning model.

The model training service 324 may provide a prediction service or service 328 with the machine learning model, which the prediction service 328 may in turn use to generate predictions of future user purchases and generate recommendations for users based on the generated predictions of future user purchases. The prediction service 328 may provide the generated predictions or recommendations for users to the application server 312. The application server 312 may in turn provide the recommendations to the users or adjust options presented to a user based on the predictions or recommendations.

After observing user actions (such as product purchases, page views and/or other actions), the application server 312 may provide the observed user actions with respect to the application server 312 to the model retraining service 332. The prediction service 328 may provide its execution log to the model retraining service 332. The execution log may include the predictions or recommendations generated by the prediction service 328 and the data used to generate the predictions or recommendations. The model retraining service 332 may create retraining data and retrain the original machine learning model to generate a retrained or updated machine learning model. If the retrained machine learning model has an improved performance over the original machine learning model that the prediction service 328 uses to generate predictions, the model retraining service 332 may provide the retrained machine learning model to the prediction service 328. The model retraining service 332 may generate evaluation data from the execution log received form the prediction service 328 and observed user actions received from the application server 312. The model retraining service 332 in turn may use the evaluation data to determine whether the retrained machine learning model has an improved performance over the original machine learning model.

As depicted in FIG. 3, a prediction computing system 336 can implement the training data store 316, the training data generation service 320, the model training service 324, the prediction service 328, and the model retraining service 332. In some implementations, the data store 316 and the services can be components of one computing system. In other implementations, the prediction computing system 336 can operate in a distributed computing environment including several computer systems that are interconnected using one or more computer networks. The prediction computing system 302 could also operate within a computing environment having a fewer or greater number of devices or services than are illustrated in FIG. 3. Thus, the depiction of prediction computing system 336 in FIG. 3 should be taken as illustrative and not limiting to the present disclosure. For example, the prediction computing system 336 could implement various Web services components and/or peer-to-peer network configurations to implement at least a portion of the processes described herein.

Figure 4:
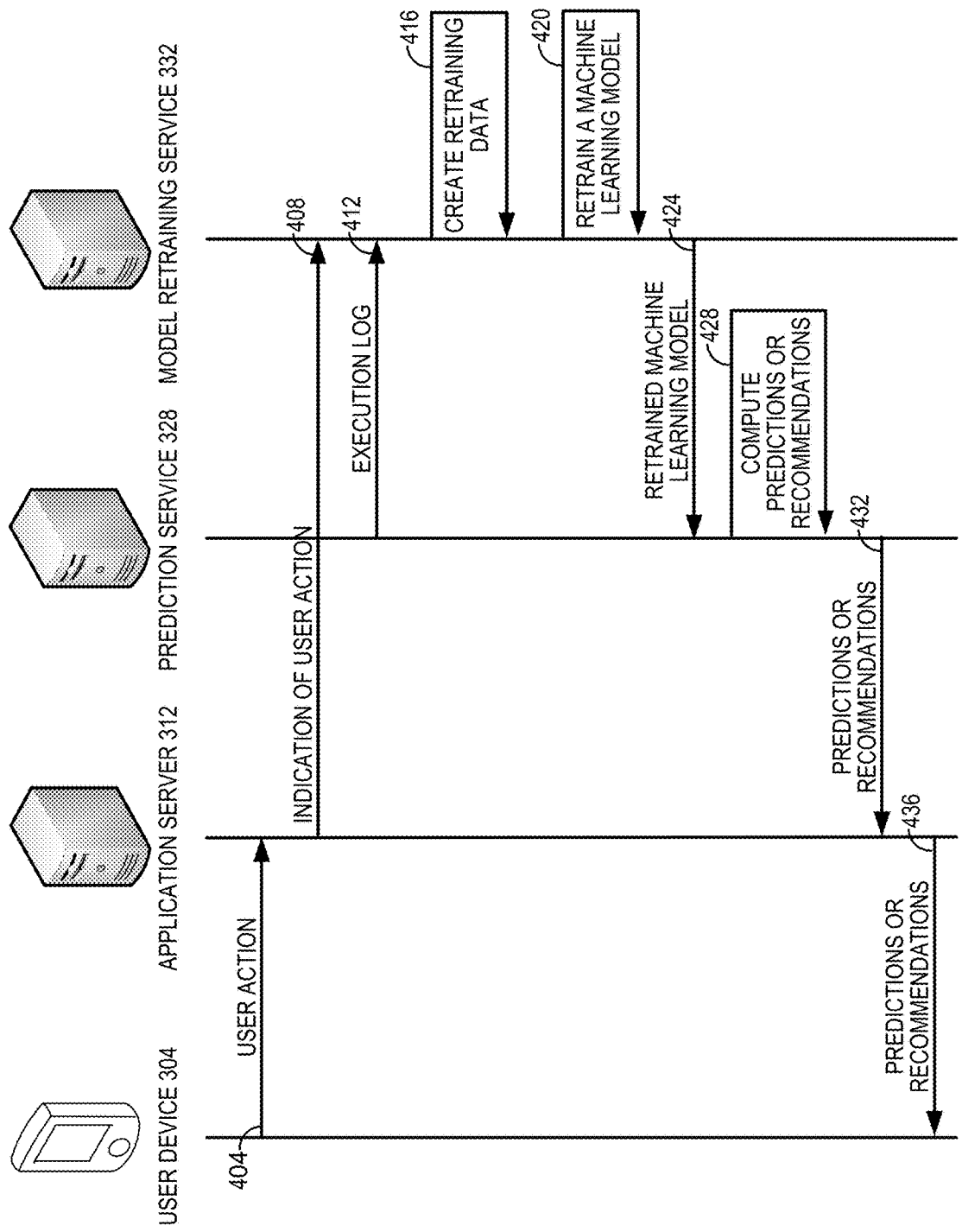
FIG. 4 is an interaction diagram illustrating one embodiment of generating retraining data and learning a retrained machine learning model.

FIG. 4 is an interaction diagram illustrating one embodiment of generating retraining data and learning a retrained machine learning model. The diagram begins at interaction 404, where a user, using a user device 304, performs an action with respect to the application server 312. The action may have, for example, viewed or purchased an item or subscribe to a service. At interaction 408, the application server 312 provides the model retraining server 332 with an indication of the user action it observes or receives. For example, after the user places an order with the application server 312 using the user device 304, the application server 312 can provide information contained in the order (such as time of purchase, the item purchased, the item type, and/or other information) to the model retraining service 332. As another example, when the user views an item on a user interface generated by the application server 312, the application server 312 can send an indication of the user action, such as the time, frequency, and duration of viewing, and the item viewed.

At interaction 412, a prediction service 328 may provide the model retraining service 332 with an execution log. The execution log may include the predictions or recommendations generated by the prediction service 328 using an original machine learning model and the data used to generate the predictions or recommendations. At interaction 416, the model retraining service 332 may create retraining data by combining the execution log received at interaction 412 and the observed user actions received at interaction 408. At interaction 420, the model retraining service 332 may train an updated or retrained machine learning model using the retraining data created at interaction 416.

At interaction 424, the model retraining service 332 may provide the retrained machine learning model to the prediction service 328. In some implementations, the model retraining service 332 may determine that the retrained machine learning model has an improved performance over the original machine learning model. At interaction 428, the prediction service 328 may generate predictions of future user purchases, and may make recommendations for users based on the generated predictions of future user purchases. At interaction 432, the prediction service 328 may provide the generated predictions or recommendations for users to the application server 312. At interaction 436, the application server 312 may provide the recommendations to the user device 304, such as by presenting item information regarding a recommended item (such as a video to view or a product to purchase) for display in a user interface.

As will be appreciated, the examples based on user actions (such as product purchases, page views and/or other actions) are for illustrative purposes only. The input and output data may be from any of a wide variety of fields for which machine learning can be used for prediction. For example, a retrained machine learning model may predict when a computing system may shut down or fail. As another example, a retrained machine learning model may predict when an error may occur on a device of a user. As a further example, a retrained machine learning model may predict when a service (such as a streaming service) may be interrupted and when users may contact a customer support personnel regarding the interruption. It will be appreciated that the input data to such models may represent a number of things other than user actions (such as data regarding the performance of a system or network), and may not include any user actions, in some embodiments.

Figure 5:
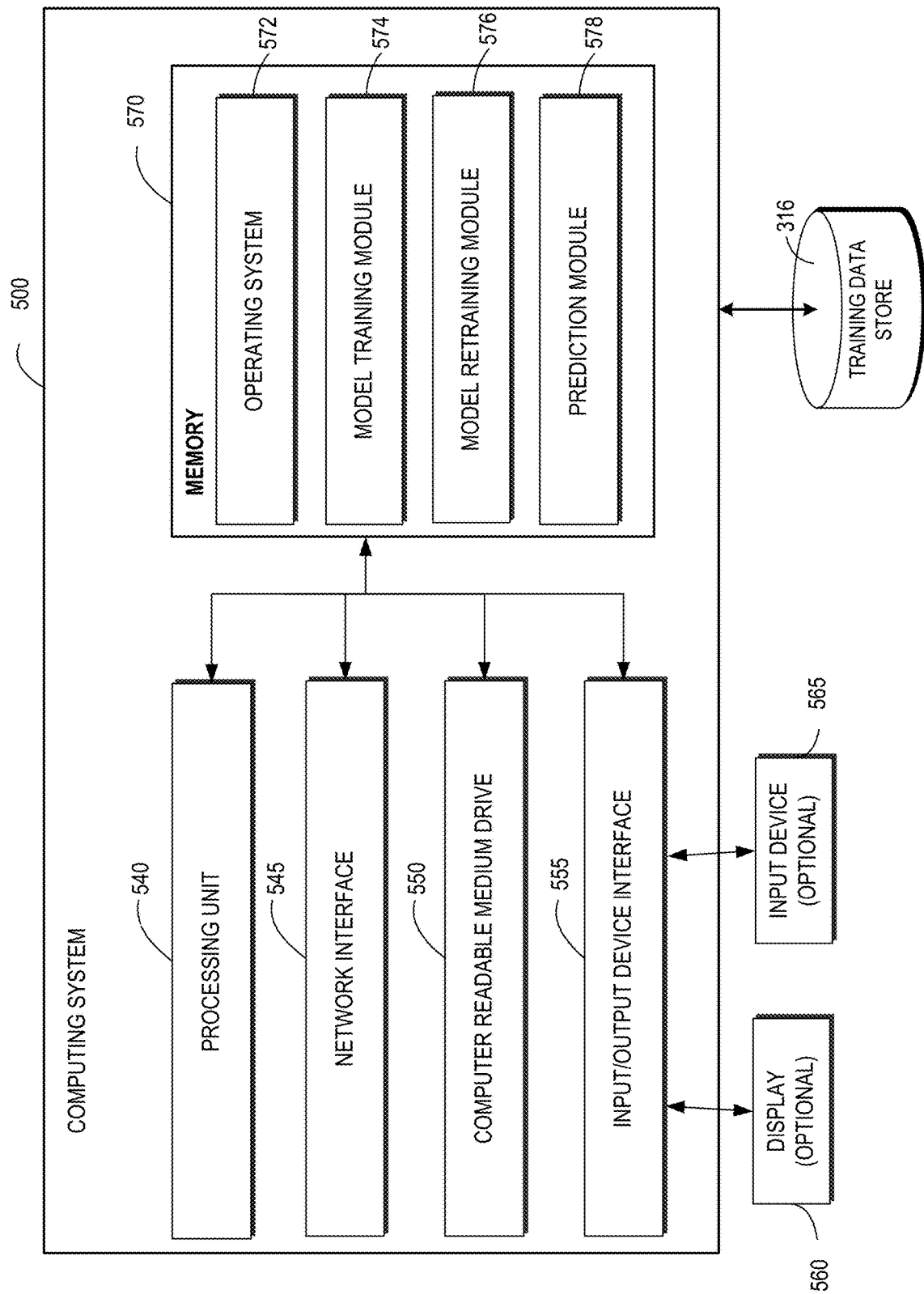
FIG. 5 depicts a general architecture of an example computing device configured to learn a machine learning model and compute a prediction result using the model.

FIG. 5 depicts a general architecture of an example computing device 500 configured to learn a machine learning model and generate a prediction result using the model. The general architecture of the computing device 500 depicted in FIG. 5 includes an arrangement of computer hardware and software components. The computing device 500 may include many more (or fewer) elements than those shown in FIG. 5. It is not necessary, however, that all of these generally conventional elements be shown in order to provide an enabling disclosure. As illustrated, the computing device 500 includes a processing unit 540, a network interface 545, a computer readable medium drive 550, an input/output device interface 555, a display 560, and an input device 565, all of which may communicate with one another by way of a communication bus. The network interface 545 may provide connectivity to one or more networks or computing systems. The processing unit 540 may thus receive information and instructions from other computing systems or services via a network. The processing unit 540 may also communicate to and from memory 570 and further provide output information for an optional display 560 via the input/output device interface 555. The input/output device interface 555 may also accept input from the optional input device 565, such as a keyboard, mouse, digital pen, microphone, touch screen, gesture recognition system, voice recognition system, gamepad, accelerometer, gyroscope, or other input device.

The memory 570 may contain computer program instructions (grouped as modules or components in some embodiments) that the processing unit 540 executes in order to implement one or more embodiments. The memory 570 generally includes RAM, ROM and/or other persistent, auxiliary or non-transitory computer-readable media. The memory 570 may store an operating system 572 that provides computer program instructions for use by the processing unit 540 in the general administration and operation of the computing device 500. The memory 370 may further include computer program instructions and other information for implementing aspects of the present disclosure. For example, in one embodiment, the memory 570 includes a model training module 574 that learns a machine learning model from training data and a model retraining module 576 that learns a retrained machine learning model from retraining data. The memory 570 may additionally or alternatively include a prediction module 578 that generates a prediction result from a prediction input vector and a machine learning model, such as a machine learning model learned by the model learning module 574 or the model retraining module 576. In addition, memory 570 may include or communicate with training data store 316 and/or one or more other data stores that stores training data or retraining data.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a hardware processor configured to execute computer-executable instructions to at least:
      obtain an execution log indicating predictions previously made by a prediction service, wherein the execution log comprises (a) a first input vector representing a previously observed action by a first user that was provided as input to the prediction service and (b) a predicted user action by the first user that was generated by the prediction service based on the input vector, wherein the prediction service generated the predicted user action by the first user with respect to an application using an original machine learning model and the first input vector, wherein the predicted user action was generated by the prediction service at a first time;

receive a first observed user action by the first user with respect to the application from the application, wherein the first observed user action occurred subsequent to the first time, wherein the predicted user action is a prediction of a possible value of the first observed user action;

create retraining data comprising a retraining data input vector and a corresponding reference retraining data output value, wherein the retraining data input vector comprises the first input vector obtained from the execution log, and wherein the reference retraining data output value comprises the first observed user action, wherein the reference retraining data output value is different than the predicted user action obtained from the execution log;

retrain the original machine learning model using the retraining data to generate a retrained machine learning model;

determine that a difference between a performance of the retrained machine learning model and a performance of the original machine learning model is greater than a performance difference threshold; and provide the prediction service with the retrained machine learning model, wherein the prediction service generates subsequent predictions using the retrained machine learning model.

2. The system of claim 1, wherein the hardware processor being configured to determine that the performance of the retrained machine learning model is greater than the performance of the original machine learning model by the performance difference threshold comprises the hardware processor being configured to:

determine a performance of the retrained machine learning model using evaluation data; and determine a performance of the original machine learning model using the evaluation data.

3. The system of claim 2, wherein the hardware processor is further configured to execute computer-executable instructions to at least:

create the evaluation data, wherein the evaluation data comprises an evaluation data input vector and a corresponding reference evaluation data output value, wherein the evaluation data input vector comprises a second input vector of a second user in the execution log, and wherein the reference evaluation data output value comprises a second observed user action of the second user with respect to the application.

4. The system of claim 3, wherein the hardware processor being configured to determine the performance of the retrained machine learning model using the evaluation data comprises the hardware processor being configured to:

generate a first evaluation prediction using the retrained machine learning model and the evaluation data input vector; and determine a first difference between the first evaluation prediction and the reference evaluation data output value; and wherein the hardware processor being configured to determine the performance of the original machine learning model using the evaluation data comprises the hardware processor being configured to:

generate a second evaluation prediction using the original machine learning model and the evaluation data input vector; and determine a second difference between the second evaluation prediction and the reference evaluation data output value.

5. The system of claim 1, wherein the first input vector comprises a first acquisition history by the first user during a first time period, and wherein the first observed user action comprises a second acquisition history by the first user during a second time period, and wherein the second time period is subsequent to the first time period.

6. The system of claim 1, wherein each of a plurality of retraining data input vectors in the retraining data is a different input vector obtained from the execution log.

7. A computer-implemented method comprising:

as implemented by one or more computing devices configured with specific executable instructions, obtaining an execution log indicating predictions previously made by a prediction service, wherein the execution log comprises both (a) a first input vector representing a previously observed action by a user that was provided as input to the prediction service and (b) a predicted output vector representing a predicted user action by the user, wherein the predicted output vector was generated by the prediction service at a first time using an original machine learning model and the first input vector;

subsequent to the prediction service generating the predicted output vector, receiving a first reference output vector representing an observed action by the user that occurred after the first time, wherein the predicted output vector comprises a prediction of a possible value of the first reference output vector;

creating retraining data comprising the first input vector obtained from the execution log and the first reference output vector, wherein the first reference output vector included in the retraining data is different than the predicted output vector obtained from the execution log; and retraining the original machine learning model using the retraining data to generate a retrained machine learning model.

8. The method of claim 7, further comprising:

determining that a difference between a performance of the retrained machine learning model with respect to evaluation data and a performance of the original machine learning model with respect to the evaluation data is greater than a performance difference threshold; and providing the prediction service with the retrained machine learning model.

9. The method of claim 7, wherein the prediction service generates subsequent predictions using the retrained machine learning model.

10. The method of claim 7, further comprising training the original machine learning model using training data.

11. The method of claim 10, wherein training the original machine learning model using the training data comprises receiving the training data from a data warehouse.

12. The method of claim 10, wherein the training data comprises a percentage of outliers in the training data with respect to the original machine learning model.

13. The method of claim 12, wherein the percentage is zero.

14. The method of claim 7, wherein the first input vector and the first reference output vector constitutes an outlier in the retraining data with respect to the retrained machine learning model.

15. The method of claim 7, wherein the first reference output vector comprises an observed action by the user with respect to an application.

16. The method of claim 15, wherein receiving the first reference output vector comprises receiving the observed action by the user in real time from the application.

17. The method of claim 7, wherein retraining the original machine learning model using the retraining data comprises:
   generating a first output vector using the retrained machine learning model and the first input vector;
   determining a difference between the first output vector and the first reference output vector; and
   updating weight values of the retrained machine learning model using the difference.

18. The method of claim 7, wherein the first input vector and the first reference output vector comprise different numbers of elements.

* * * * *